May 1, 1934.  A. J. DOYLE  1,957,160
CULTIVATOR SHIELD
Filed Sept. 7, 1933
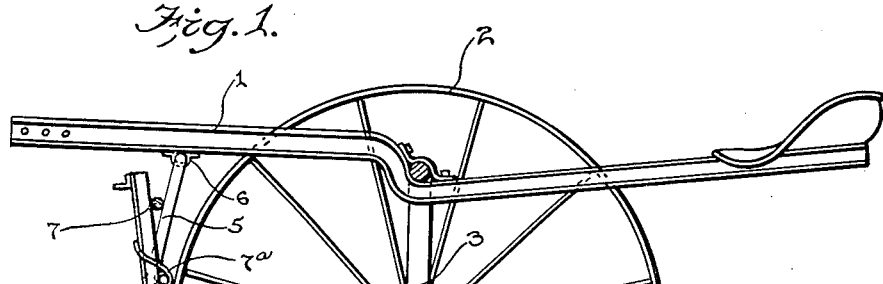
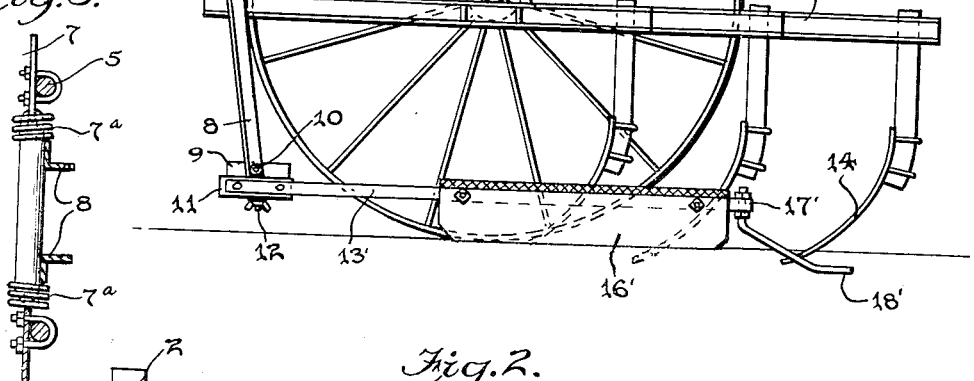
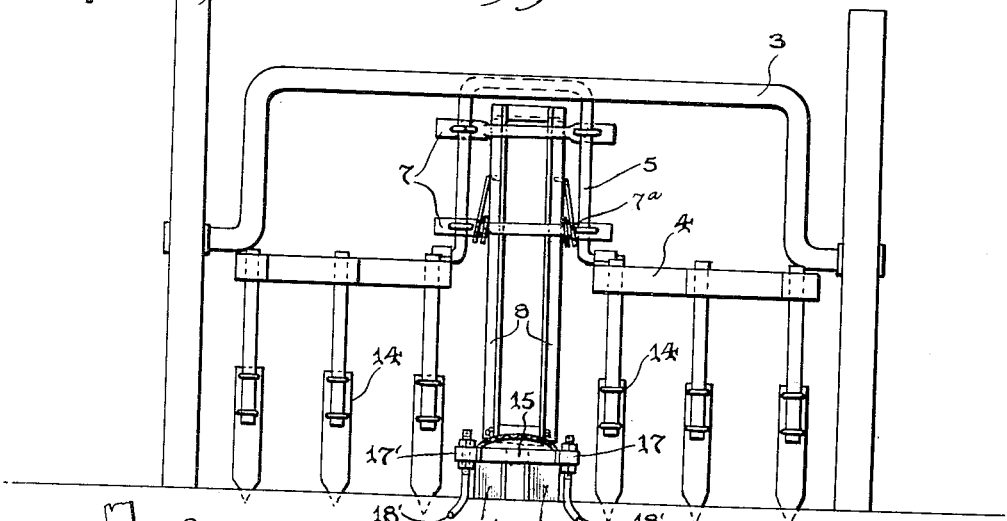
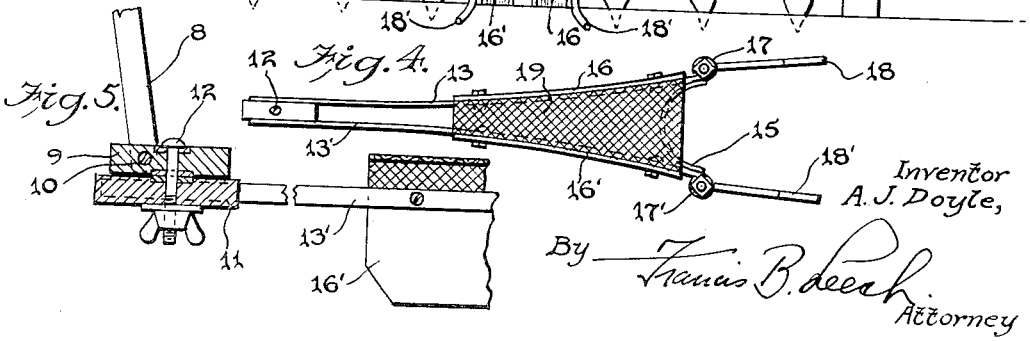
Inventor
A. J. Doyle,
By Francis B. Leech
Attorney Patented May 1, 1934

1,957,160

UNITED STATES PATENT OFFICE 1,957,160

CULTIVATOR SHIELD

Adrian J. Doyle, Aurora, Ill.

Application September 7, 1933, Serial No. 688,517

3 Claims. (Cl. 97—188)

This invention relates to an attachment for cultivators, and, more particularly, to a plant shield for use with corn cultivators.

In cultivating new corn with either a shovel or disc type cultivator, it is essential that the young corn be protected from clods of earth, stones, litter, and stubble which are thrown around by the shovels and discs. It is for this reason that many cultivators are provided with plant shields which generally consist of fixed blades rigidly attached to the inside of the shovels. From a practical standpoint, these rigid shields are of little value in protecting the young plants while cultivating.

The object of the present invention is to provide a plant shield which straddles the young plants and one which is freely suspended from the cultivator so that it may follow the corn row and also follow the contour of the field.

Another object of the invention is to provide a plant shield which may be readily attached to any of the existing cultivators and one so constructed that it may be easily repaired and disassembled when new parts are necessary.

A still further object of the invention is to form an improved plant shield so as to not only protect the young plants from damage from stones, etc., but to also smooth the earth adjacent the plants and pulverize the soil as it passes over the row which insures proper absorption and retention of moisture.

Referring to the drawing, Fig. 1 is a view in elevation showing the frame of the cultivator with the invention attached thereto.

Fig. 2 is a rear view of the cultivator and plant shield.

Figs. 3, 4, and 5 are detail views of portions of the shield and attaching means.

As before mentioned, this invention is an attachment to be installed on conventional sulky cultivators and is equally adaptable to either shovel or disc types. In the drawing, 1 illustrates the main frame of a conventional shovel type cultivator having the usual supporting wheels 2 and drop axle 3 from which is supported the gang shovel beams 4. The customary shovel raising and lowering mechanism is omitted from the drawing as it forms no part of the invention. The secondary frame or beams 4, aside from its attachment to axle 3, is pivotally hung from main frame 1 by arch 5, a journal 6 forming the point of attachment with the main frame.

It is preferable to suspend the plant shield from the arch 5 and this is accomplished by bolting horizontal braces 7 to the vertical sections of the arch. To the lower braces 7 is pivoted a pair of spaced angle irons 8 which terminate a short distance above the ground. As shown in Fig. 3 the lower brace 7 is rounded intermediate its ends forming a bearing for the vertical bars 8. To retain the bars in pivoted and resilient contact with the rounded section of the brace tension springs 7a are affixed to and coiled around the ends of 7 and terminate against the angle irons 8. The resiliency of the springs 7a normally forces the upper portion of the vertical bars 8 against the upper brace 7 but allows pivotal movement of the bars 8 when their lower ends strike an obstruction and thus prevents breakage. Between the lower ends of the angle irons 8 is a filler block 9 having a horizontal pivot bolt 10 passing through the ends of the angle irons and block 9. Contacting with the bottom of the block 9 is second block 11 joined thereto by vertical pivot 12 which may be a bolt and wing nut connection to permit easy disassembling.

The plant shield proper comprises two metal strips 13 and 13' attached to the sides of the block 11 and extending rearwardly in a horizontal plane parallel with the earth and normally lies centrally of the split series of gang shovels 14. The side frames 13 and 13' diverge and are retained in spread position at their ends by means of transverse brace 15. To these side frames are bolted vertical blades 16 and 16' which straddle the plants as the cultivator is moved down the row.

The extreme rear ends of the side frames 13 and 13' are bent to provide eyes 17 and 17' and through these eyes pass the upper sections of the trailer arms or rods 18 and 18', which are threaded with bolts contacting above and below the eyes so that vertical adjustment may be secured. It will be noted that these trailers are spread outwardly and in use they contact with the ground in the furrows between the rows. By adjusting the position of these trailers the height of the blades 16 and 16' above the ground adjacent the plants is determined.

It will be understood that upon forward movement of the sulky, the shield straddles the plants, and, by reason of its pivotal suspension, it is permitted vertical movement to follow the contour of the ground and may also move from side to side or weave to compensate for inaccuracies of the row. Consequently, the shields protect the young plants from any stones or trash thrown by the shovels or discs and thereby prevent damage to the corn. As a further safeguard, a coarse screen 19 is preferably attached to the side frames and completely covers the opening between the plates of the shield to ensure that no trash is thrown over them.

What I claim is:

1. A plant shield for cultivators including a pair of spaced vertical arms pivotally and resiliently attached to a cultivator frame, a pair of spaced vertical blades, attached for horizontal and vertical movement to the lower ends of said vertical arms, the said blades diverging from their suspension points, and a screen lying between the upper edges of the blades.

2. A plant shield for attachment to a wheeled structure including a pair of spaced vertical bars, a horizontal rod attached to portions of said wheeled structure and contacting with said vertical bars adjacent their upper ends, the said rod extending outwardly beyond said bars with coil springs encircling the ends thereof and resiliently bearing on said vertical bars, and a pair of vertically disposed and laterally spaced shields pivotally attached to the lower ends of said bars.

3. A plant shield for attachment to a wheeled farming implement including a pair of spaced vertical angle bars pivotally and resiliently hung from said implement, the lower ends of said bars terminating in a block pivoted about a horizontal axis, a second block pivoted about a vertical axis bearing on said first mentioned block, and a pair of vertical plant shields affixed to the sides of said second block.

ADRIAN J. DOYLE.